United States Patent [19]

Gray

[11] Patent Number: 4,584,765
[45] Date of Patent: Apr. 29, 1986

[54] APPARATUS FOR ASSEMBLING TUBES IN A HEAT EXCHANGER

[75] Inventor: Kenneth Gray, East Syracuse, N.Y.

[73] Assignee: Carrier Corporation, Syracuse, N.Y.

[21] Appl. No.: 605,096

[22] Filed: Apr. 30, 1984

[51] Int. Cl.$^4$ ............................................. B23P 15/26
[52] U.S. Cl. ................................. 29/727; 29/157.3 C; 29/157.4; 29/523
[58] Field of Search ................ 29/157.3 R, 157.3 C, 29/157.4, 466, 726, 467, 727, 33 G, 523, DIG. 43, 445, 464

[56] References Cited

U.S. PATENT DOCUMENTS

| | | | |
|---|---|---|---|
| 3,437,133 | 4/1969 | Bullard | 29/157.4 X |
| 3,487,523 | 1/1970 | Ames | 29/523 X |
| 3,688,533 | 9/1972 | Ames | 29/727 X |
| 3,824,668 | 7/1974 | Wightman | 29/727 |
| 4,195,540 | 4/1980 | Franks | 414/27 X |
| 4,228,573 | 10/1980 | Barnard | 29/157.3 R |
| 4,286,486 | 9/1981 | Franks | 29/157.3 R X |
| 4,321,739 | 3/1982 | Martin et al. | 29/157.3 R X |
| 4,459,917 | 7/1984 | Michael et al. | 29/157.3 R X |

FOREIGN PATENT DOCUMENTS

859101 8/1981 U.S.S.R. ................................ 29/726

Primary Examiner—Carl E. Hall
Attorney, Agent, or Firm—Thomas J. Wall

[57] ABSTRACT

Apparatus for expanding hairpin tubes into a fin pack unit that involves a special clamping fixture for securing the belled ends of the tubes to hold the ends of the tubes immobile as tube expanders are passed through the tubes to expand the tube walls in the fin plates and tube sheets of the unit. The tubes are expanded in tension which permits the bells to be formed against one of the tube sheets thereby eliminating the weakest region in the heat exchanger flow circuit.

16 Claims, 10 Drawing Figures

PRIOR ART

4,584,765

APPARATUS FOR ASSEMBLING TUBES IN A HEAT EXCHANGER

BACKGROUND OF THE INVENTION

This invention relates generally to assembling a plate-fin heat exchanger and, in particular, to a technique for tension expanding hairpin tubes into a fin pack unit.

In many small plate-fin heat exchanger units, such as those utilized in room air conditioners, and automotive radiators, hairpin tubes are laced into axially aligned holes formed in the fin plates and tube sheets making up the unit with the open ends of the tubes protruding beyond one of the tube sheets. The walls of the tubes are then expanded radially into contact against the fin collars and tube sheets to hold them in assembly. After expansion, the open ends of the tubes are belled and return bends soldered therein to close the flow circuit of the unit.

As explained in greater detail in U.S. Pat. No. 4,228,573, the tube expansion process is generally carried out by passing tube expanding rods upwardly through the open ends of the hairpin tubes. A backing plate is placed against the tube bends during expansion to prevent the tubes from being driven out of the unit as the tools are forced therethrough. As a result of this holding action the tubes are compressed rearwardly as they are being expanded outwardly by the tools. This in turn, causes the tubes to shrink so that the axial length of each tube can vary dramatically in regard to its neighbor in final assembly. Because of the differences in tube length, belling of the tubes is difficult and generally results in uneven or misaligned bells being formed in the tube ends. The return bend therefore cannot be properly seated within the bells leading to the formation of relatively weak or incomplete solder joints in this critical region.

In order to better facilitate the formation of the tube bells and the joining of the return bends therein, it has been the common practice in the art to bring the open ends of the hairpins a considerable distance out from the adjacent tube sheet. The additional length of tube allows each bell to be brought to full depth without interference from the tube sheet and also permits the return bend joint to be completely immersed in a solder bath to insure that solder will flow into the entire joint region without wetting the tube sheet. The unsupported length of tube between the bell and the tube sheet, however, represents the weakest section in the unit. Hydrostatic tests have shown that the flow circuit will generally rupture in this region when exposed to high internal stresses. Beyond weakening the unit the added length of tubing wastes costly material and thus raises the cost of each unit. Furthermore, the added tube length makes it difficult to compact the unit which in the case of a room air conditioner is of primary importance.

SUMMARY OF THE INVENTION

It is therefore an object of the present invention to improve plate-fin heat exchangers.

It is a further object of the present invention to simplify the manufacture of a plate-fin heat exchanger.

A still further object of the present invention is to minimize the amount of material required to construct a plate-fin heat exchanger.

Another object of the present invention is to improve the hydrostatic burst strength of a plate-fin heat exchanger.

Yet another object of the present invention is to reduce the manufacturing cost of a plate-fin heat exchanger.

A still further object of the present invention is to compact a plate-fin heat exchanger.

These and other objects of the present invention are attained by means of automatic apparatus for belling the open ends of hairpin tubes laced into a fin pack unit against one of the tube sheets to minimize the unsupported tube length between the bells and the tube sheet, a clamping fixture for holding the belled ends of the tubes against axial displacement and expanding tools arranged to move through the open ends of the tubes to expand the tube walls into contact against the fin collars and tube sheets of the unit while the bells are clamped in place whereby the tubes are expanded in tension.

BRIEF DESCRIPTION OF THE DRAWINGS

For a better understanding of these and other objects of the present invention reference is had to the following detailed description of the invention which is to be read in conjunction with the accompanying drawings, wherein.

DESCRIPTION OF THE INVENTION

Figure 1:
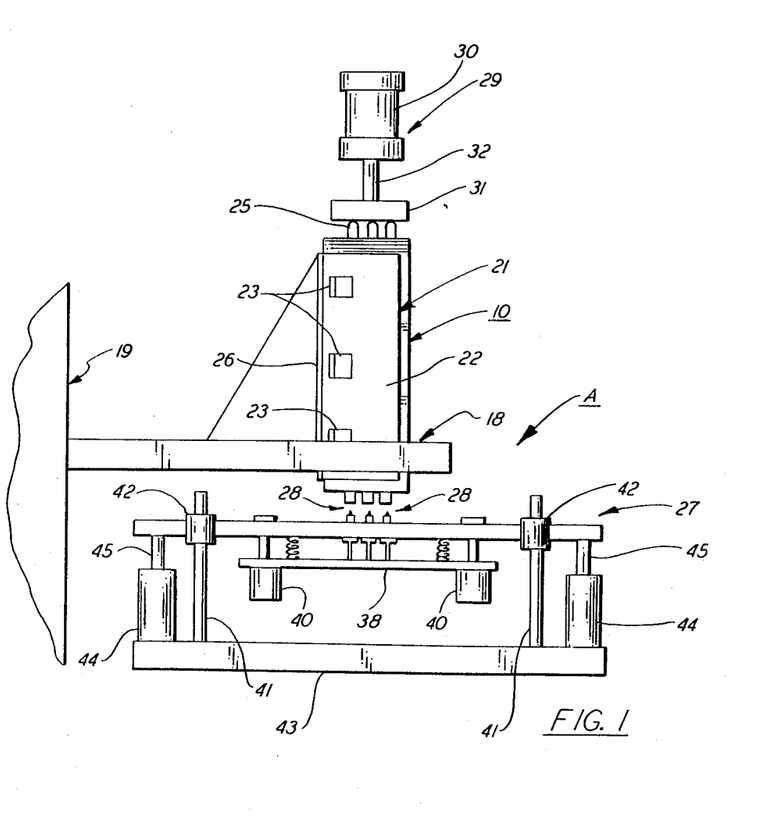
FIG. 1 is a side elevation showing a tube belling station utilized in the practice of the present invention.
Figure 2:
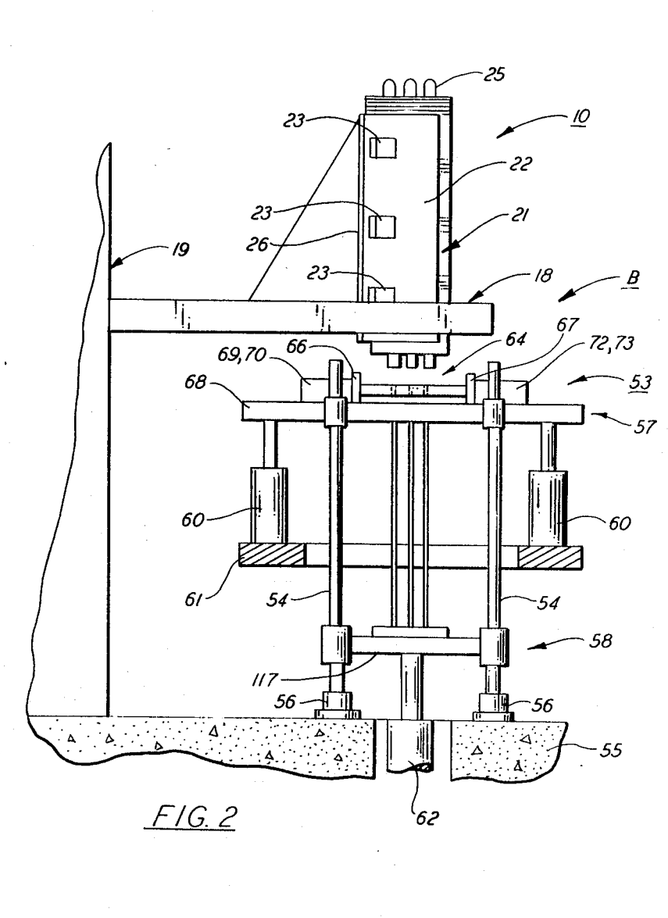
FIG. 2 is also a side elevation showing a tube expanding station utilized in the practice of the present invention.

Turning initially to FIGS. 1 and 2, there is shown two automatic processing stations employed in the practice of the present invention for belling and expanding hairpin tubes that have been previously laced into a plate-fin heat exchanger unit, generally referenced 10. For the purpose of this disclosure a fin pack unit shall mean an assembly having a series of prestamped fin plates that are stacked one over the other between a pair of perforated headers or tube sheets. The plates are typically stamped to the same dimension from thin sheets of metal, such as aluminum. Equally spaced collars having tube receiving holes centered therein are also stamped in the plates so that the holes in the plates are co-axially aligned in assembly with the holes formed in the perforated tube sheets to provide tube receiving passages within the unit. To close the assembly, the hairpin tubes are initially passed through the receiving passages by any suitable means and the tube walls are then expanded radially into locking contact against both the fins and tube sheets.

Figure 10:
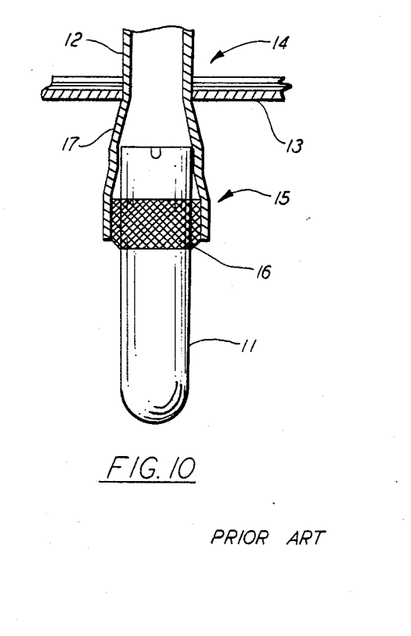
FIG. 10 is a side elevation in partial section showing a return bend assembly used in the prior art.

Heretofore it has been the practice in the prior art to expand the hairpin tubes into the fin pack unit before forming the return bells in the tubes. As noted above, a generous length of tube was provided at open end thereof to facilitate formation of the return bell and to permit soldering of the return therein. As illustrated in FIG. 10, the typical return 11, when joined to the tube 12 was positioned some distance from the tube sheet 13 of the fin pack unit 14. The bell 15, which in this case is a common bell referred to in the trade as an "Alcoa" bell, has a complex geometry designed to permit solder 16 to flow freely into the joint region. As can be seen, an unsupported length of tube 17 extends outwardly from the tube sheet. This section represents a weak joint in the flow circuit and generally fails before the other sections of the circuit.

Turning now to FIGS. 1 and 2 there is shown a movable support platform 18 that is secured to an indexing unit 19 adapted to index a fin pack unit 10 mounted therein sequentially between a tube belling station A (FIG. 1) and a tube expanding station B (FIG. 2). The fin pack unit is held within the support platform by means of a holding fixture 21 that includes a pair of clamping members, one of which is depicted at 22, which are adapted to act against opposing sidewalls of the fin pack unit. Each clamping member is capable of being moved laterally into and out of engagement with the fin pack unit by means of a series of double-acting hydraulic actuators 23—23. Although not shown the front face of each clamping member, that is, the face which comes in contact with the heat exchanger unit, is covered with a thick rubber blanket that is capable of deforming about the fin plates and/or tube sheets to securely hold the unit within the support member without damaging the component parts thereof. In the present invention, hairpin tubes 25—25 have been previously laced into the fin pack unit by any suitable means prior to the unit being loaded into the holding fixture. The unit is registered against the back wall 26 of the holding fixture so that the hairpin tubes hang down in a generally vertical direction as shown.

Figure 3:
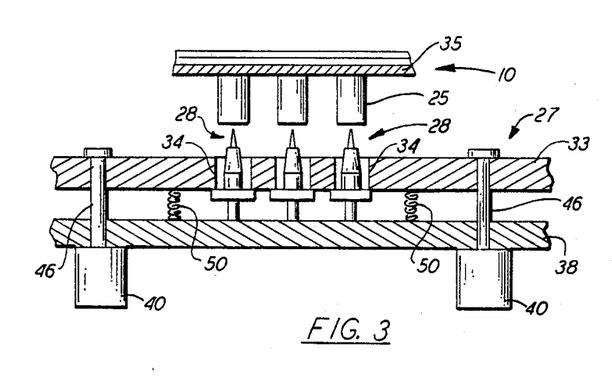
FIG. 3 is an enlarged view of a belling fixture utilized in the tube belling station illustrated in FIG. 1.
Figure 4:
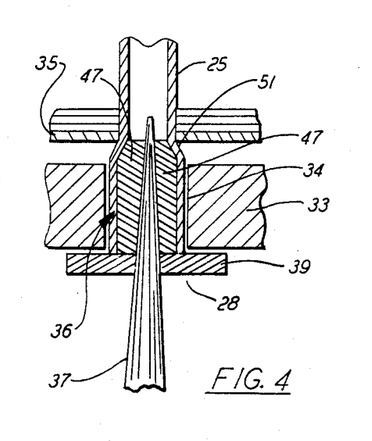
FIG. 4 is a further enlarged view in section showing one of the belling tools utilized in the belling fixture.

The tube belling station A shown in FIG. 1, includes a hydraulically actuated table 27 that is mounted beneath the support platform 18. The platform functions to index the fin pack unit within the station so that the open ends of the hairpin tubes are suspended directly over a series of belling tools 28—28 mounted in the table. In this particular embodiment, the fin pack unit contains three parallel rows of hairpins. Three rows of belling tools, equal in number to the total number of open tube ends contained in the assembly, are used to carry out the present belling operation. A movable backing tool 29 is located in the belling station immediately over the fin pack assembly. The backing tool includes a double acting hydraulic cylinder 30 that is attached to a horizontally disposed backing plate 31 by means of piston rod 32 so that the backing plate can be moved toward and away from the hairpin bends situated along the top of the unit. The plate is brought downwardly by the cylinder into holding contact against the top of the tube bend to align tubes in assembly and to prevent the tubes from being displaced vertically as the return bells are being formed in the open ends of the tubes. As illustrated in FIGS. 3 and 4, there is shown in greater detail the belling tools employed in the practice of the present invention. The movable table 27 includes an upper collet plate 33 having a plurality of tube receiving holes 34—34 formed therein which are situated immediately beneath the open ends of the hairpin tubes 25—25 which extend downwardly from the bottom tube sheets 35 of the fin pack unit. Each belling tool contains a flanged internal split collet 36 (FIG. 4) and a co-acting tapered expanding pin 37. The tapered pins are anchored securely by any suitable means in a second pin plate 38 horizontally disposed beneath the collet plate. The bottom of each collet contains an expanded flange 39 that prevents the collet from passing through hole 34. The pin plate is operatively connected to the collet plate by means of air or hydraulically actuated cylinders 40—40. The collet plate, as shown in FIG. 1, is slidably supported within a series of upraised vertical rails 41—41 by means of bearing blocks 42—42. The collet plate extends outwardly to either side of the rails and is connected to a stationery base member 43 by means of double acting cylinders 44—44. The cylinders are secured to the base member 43 by any suitable means and are coupled to the collet plate by extendable arm 45—45.

Initially, upon a fin pack unit being indexed into the belling station, and the backing plate being brought down against the tube bends, the table 27 is raised to insert each of the internal split collets 28—28 into the open ends of the hairpin tubes 25—25 as shown in FIG. 4. Once the collets are properly located within the tubes the cylinders 40—40 are actuated causing normally extended header rods 46—46 (FIG. 3) to be retracted into the cylinders. This, in turn, draws the pin plate 38 upwardly towards the collet plate thereby driving the pins into the collets. Each collet is made up of a series of split contoured sections 47—47 that are capable of being expanded outwardly in a radial direction as the tapered pins are driven upwardly through the center of the collet assembly. The outside periphery of the collet sections is arranged so that it describes a cylinder that terminates at the upper portion thereof in a truncated cone. The drive associated with the table is arranged so that when the table is fully extended, the top end of each collet is positioned just beneath the bottom surface of the lower tube sheet 35. As the expanding rods are driven through the collets, the collets expand outwardly in a radial direction thereby forming well defined bells in the tube ends adjacent to the bottom tube sheet 35. Each bell contains a short tapered section 51 that is forced tightly against the tube sheet during the belling operation. Insertion of a return bend into the bell will substantially fill the belled area thus creating a high strength double wall construction in a region which heretofore represented the weakest front in the unit.

Once the bells have been formed, the holding pressure on cylinders 40—40 is released and the pin plate 38 is moved back rapidly under the biasing pressure of springs 50—50 to withdraw the pins 37—37 from the collets. This in turn relieves the collet section so that they may be brought out of the belled end of the tube. The table 27 is now moved to a fully retracted position by means of cylinders 44—44 thus removing the collets from the tubes and clearing the fin pack unit so that it may be indexed into the next processing station.

Upon clearing the fin pack unit the platform is indexed into the tube expanding station B to position the fin pack unit 10 over a combination bell clamping fixture and tube expanding assembly generally depicted at 53. A pair of vertically disposed guide rails 54—54 are securely anchored in floor 55 by means of anchor pads 56—56. An upper elevator assembly 57 and a lower elevator assembly 58 are each independently mounted within the station upon the rails. The upper elevator assembly is driven upon the rails by means of double acting hydraulic cylinders 60—60 secured to a stationary member 61 while the lower elevator assembly is driven by means of a double acting hydraulic cylinder 62 that is recessed below the elevator within the floor.

A tube clamping fixture, generally referenced 64, is carried upon the upper elevator 57. The clamping fixture is shown in greater detail with reference to FIGS. 5 through 8. The assembly includes a pair of opposed wall members 66 and 67 that are secured to the upper elevator table 68 by any suitable means. A pair of coacting cylinders 69 and 70 are secured by screws 71—71 to the sidewall 66 of the fixture. A second pair of coacting cylinders 72 and 73 are similarly secured to the opposite sidewall 67. The sidewalls are held in a spaced apart relationship by means of a series of tie rods 75—75 that are locked in place using lock nuts 76—76. Three pair of coacting jaws 77, 78 and 79 are slidably suspended between the walls. As will be explained in greater detail below each of the jaw pair members is arranged to close over the belled ends of the tubes contained in one of the fin pack rows to securely hold the bells in place as the tubes are expanded into the unit.

The pairs 77, 78 and 79 are each suspended between the walls 66 and 67 of the fixture upon two sets of slide bars. The bars are mounted at either end of the fixture and each set includes an outboard slide bar 80 and an inboard slide bar 81. The outboard slide bar is secured by means of set screws 83 to one jaw member in each jaw pair while the inboard slide bar is similarly secured to the opposite jaw members in each pair. Accordingly, slide bar 81 is secured to the jaw members 77a, 78a and 79a while the other slide bar 80 is secured to the opposing jaw members 77b, 78b and 79b. As can be seen, through means of the slide bar connection, corresponding jaw members in each jaw pair are adapted to move in unison as the jaws are opened and closed. The jaw members are illustrated in a fully closed condition in FIG. 5 and in a fully opened condition in FIG. 6.

Figure 5:
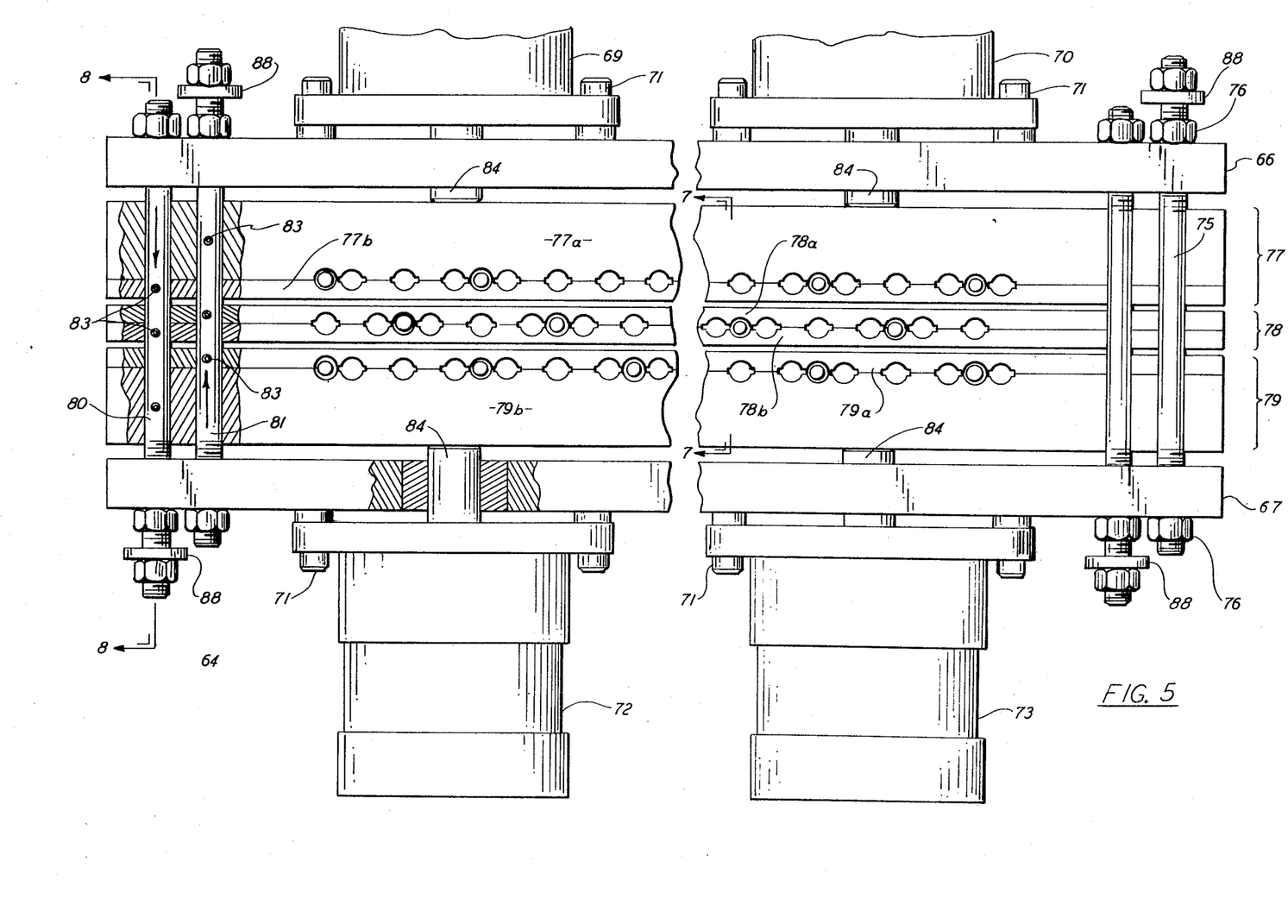
FIG. 5 is an enlarged plan view of the bell clamping fixture utilized in the tube expanding station of the present invention.
Figure 8:
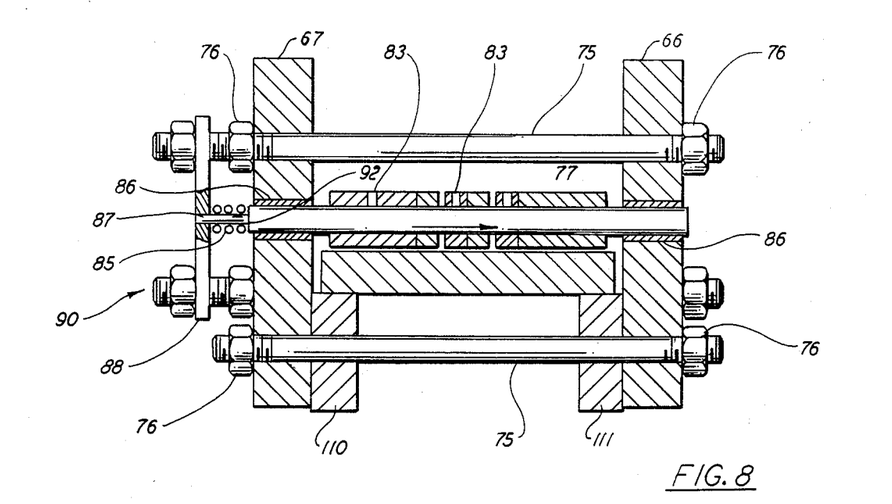
FIG. 8 is a section taken along line 8—8 of FIG. 5.

As best seen in FIG. 8 the jaw members are normally forced into an open condition by means of biasing springs 85 that are arranged to act upon each of the slide bars to urge the bar in an axial direction as indicated by the arrows in FIGS. 5 and 8. Each of the slide bars is movably mounted within the sidewalls of the fixture by means of bushings 86—86. A reduced shank 87 extends outwardly from the main body of each bar and is slidably received in a vertically disposed bracket 88 that is suspended between one of the tie rods 75 and a mounting lug 90. The spring is wound about the shank and is arranged to act between the bracket 88 and a shoulder 92 formed in the bar so as to force the bar laterally away from the plate.

As best seen in FIG. 5 the brackets associated with each of the slide bar pairs are situated on either side of the sidewalls 66 and 67 whereby the springs act to move each of the bars in an opposite direction.

Closing of the jaw pairs is achieved through means of cylinders 69-70 and 72-73. Each of the cylinders contains a piston rod 84 that passes through the adjacent wall of the fixture and is seated against one of the two outside jaw members. The piston rods associated with cylinder 69 and 70 are seated against outer jaw member 77a while the rods associated with cylinder 72 and 73 are seated against outer jaw member 79b. Normally, the rods are retracted to allow the jaws to be forced into an open position through the instrumentality of the biasing springs. When fully opened, the outer jaw members 77a and 79b are arrested against the walls 66 and 67 respectfully. To close the jaw members the piston rods are extended thus pushing the opposing jaws towards each other.

Figure 6:
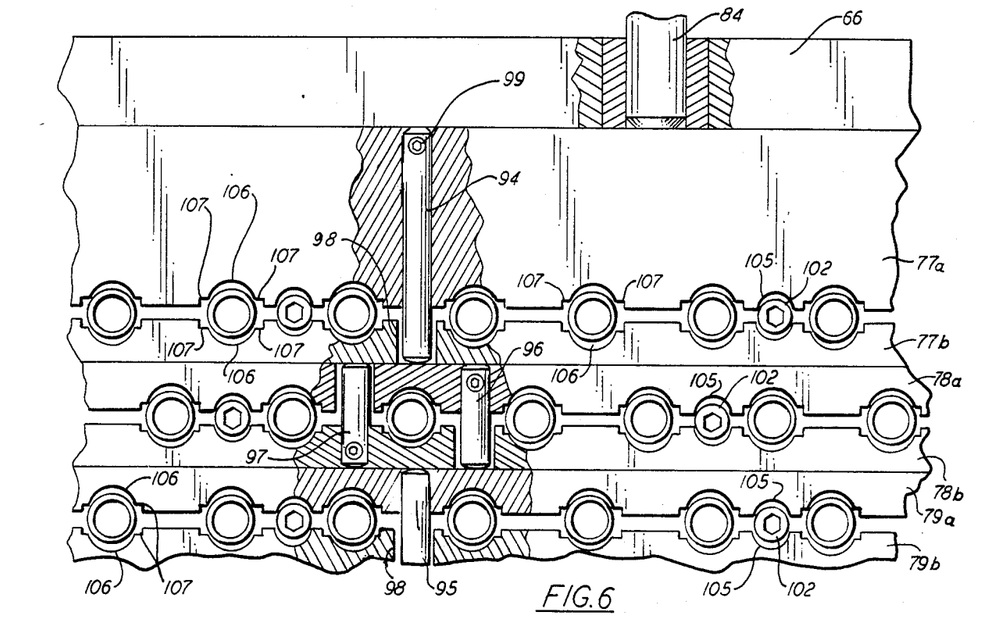
FIG. 6 is a further enlarged view of the clamping fixture.

As illustrated in FIG. 6, the jaw pairs are each interrelated by means of a series of internally mounted horizontally aligned push rods that act in concert to force the jaws closed at short intervals along the entire length of the clamping fixture. Because of the closeness of the heat exchanger tube rows the interior jaw members of the fixture, which must operate in this confined area, are relatively long thin members. The interior members function as thin beams which tend to bend or bow as the jaws are closed about the tube bells. The push rods are strategically spaced along the length of the members to prevent the members from bending when brought to a closed position. The push rods include a series of relatively longer push rod 94 and 95 which are mounted within the two outer jaw pairs 77 and 79 and a series of shorter push rods 96 and 97 which are mounted within the inner jaw pair 78. The longer drive pins 94 and 95 are mounted within clearance holes 98—98 that pass laterally through each of the jaw members in jaw pairs 77 and 79. Each push rod is secured to the outer jaw member by a set screw 99 and allowed to slide freely within the opposite jaw member.

In operation, to close the jaws, the drive cylinders are actuated to extend the piston rods 84—84 inwardly against jaw member 77a and 77b. This drives the other jaw members into a closed position through the action of the slide bar arrangement. Simultaneously therewith, the push rods spaced along the jaw members are also moved inwardly to apply a uniform closing pressure on each jaw member along the length clamp. When brought to a fully closed position, the parting line of each jaw pair is centered along the longitudinal axes of a tube row.

Figure 7:
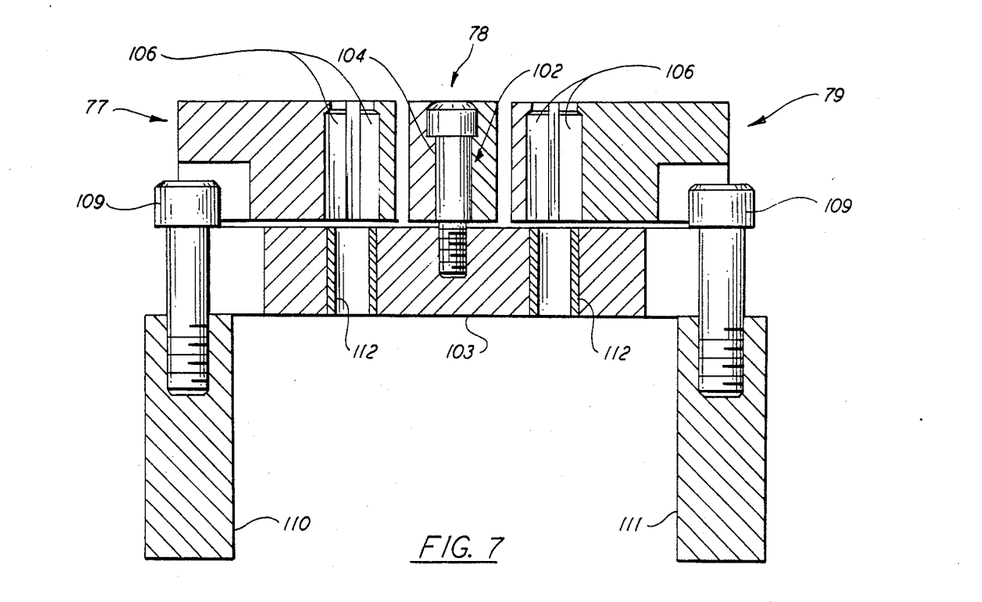
FIG. 7 is a section taken along line 7—7 of FIG. 5.

A series of vertically disposed stops 102 are threaded into a busing plate 103 mounted immediately beneath the jaw members as shown in FIG. 7. Each stop is centered upon one of the central axes of the tube rows and contains an accurately ground body section 104 against which the coacting jaw members seat during closure. The coacting jaw members each contain vertically disposed co-operating grooves 105—105 that are contoured to close against the body of the stop members and thus register the jaws in closure. Each jaw pair also includes a series of coacting tube receiving cavities 106—106 (FIG. 6). The cavities are arranged to close over the bells formed in the tube ends so as to secure the bells against movement while the tubes are being expanded into the fin packs. A rectangular vertical groove 107 is formed at the corner edges of each cavity to provide sufficient clearance to permit the cavity to pass freely over the bells without binding against the bell wall.

Figure 9:
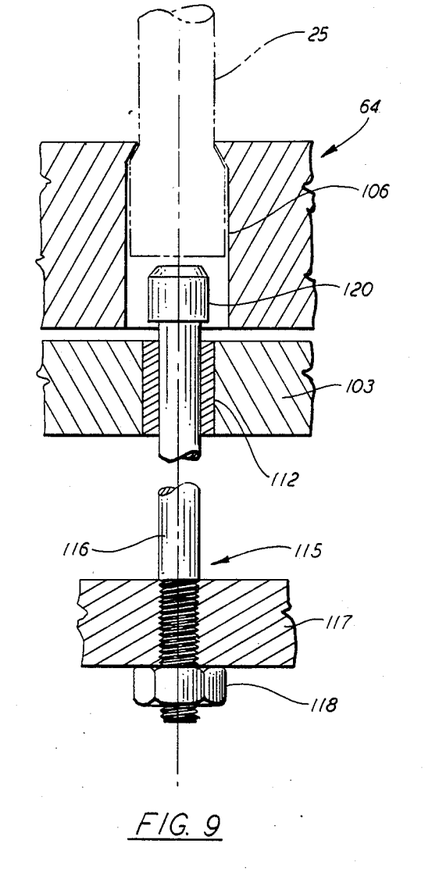
FIG. 9 is an enlarged side elevation showing one of the expanding rods used in the present invention.

As shown in FIG. 7, the bushing plate 103 is secured by bolt 109—109 upon a pair of raised blocks 110 and 111 which are fixed by any suitable means to the upper elevator assembly. The busing plate houses a plurality of bushings 112—112 which are axially aligned beneath each of the cavities formed in the jaw members. As illustrated in greater detail in FIG. 9, an expansion rod 115 is slidably contained within each of the bushings. The rod includes an elongated shank 116 that is threaded into a base plate 117 contained in the lower elevator assembly 58. A locking nut 118 is employed to secure each rod in the base plate. An expanding head 120 is carried at the top end of each rod. The head is normally positioned within the bell cavity of the overlying jaw members as shown in FIG. 9.

In operation, with the fin pack indexed within the tube expanding station B, the upper elevator assembly 57 is raised to place the open jaw members of the clamping fixture adjacent to and in close proximity with the bottom surface of the tube sheet so that each of the tube bells is received within an opened cavity formed between coacting jaw pair members. The clamping fixture cylinders 69,70 and 72, 73 are then extended to close the jaws about the bells to secure the open ends of the tubes against movement. It should be noted at this point, however, that the main part of each hairpin tube is loosely contained within a tube receiving hole in the fin pack unit. With the bells securely locked in place, the lower elevator 58 is now moved upwardly to drive the expanding head of the tools into the open ends of the tubes. The stroke of the lower elevator drive piston is sufficient to pass the expanding heads through the entire fin pack unit. Under the action of the tool, the tube walls are expanded outwardly in a radial direction to lock the tubes against the fin plates and the tube sheets. The unrestrained portion of the tubes above the bells is also permitted to deform axially in tension as the tools move therethrough where upon the belled ends of the tubes remain uniformly positioned in regard to the bottom tube sheet of the fin pack. After the tubes have been expanded into locking engagement with the fin pack elements the expanding tools are retracted and the jaw members of the clamping fixture are placed in an open position. The upper elevator is then lowered to clear the fin pack unit and the unit is removed from the station.

It should be evident from the disclosure above, that by deforming the tube in tension it is possible to initially bring the tube bells tight against the adjacent tube sheet thereby minimizing the unsupported length of tube run passing between the bell ends of the tubes and the adjacent tube sheet. This eliminates what has heretofore been identified as the weak point in this type of heat exchanger. Furthermore, because the bells are now uniformly aligned beneath the tube sheet, the return bends can be accurately nested in the bells either by a hand loading operation, or by use of automated equipment. By pre-tinning the return bends prior to soldering, the solder can be brought via capillary action into the joint region using well-known joining techniques. Thereby insuring that a leak-tight high strength joint is formed in this critical section.

While this invention has been described with reference to the disclosure above, it is not confined to the details set forth and this application is intended to cover any modifications or changes as may come within the scope of the following claims.

I claim:

1. Apparatus for expanding tubes under tension into a plate-fin heat exchanger unit having a plurality of parallelly aligned hairpin tubes passing in rows through the fin plates and tube sheets of the unit and the open ends of the tubes being belled adjacent to one of the tube sheets that includes a clamping fixture having a pair of opposed stationary walls, coacting jaw pairs equal in number to the number of tube rows in the unit, a support means for movably suspending said jaw pairs between the walls, each of said jaw pairs having a first jaw member and a second jaw member arranged to open and close about the belled ends of the tubes contained in one of said tube rows, said movable support means including a first slide means secured to the corresponding first jaw member in each jaw pair, and a second slide means secured to the corresponding second jaw member in each jaw pair whereby the jaw pairs move in unison as they are opened and closed, biasing means for urging the jaw members into a normally opened position and closure means acting upon at least one of the first jaw members and at least one of the second jaw members to move the members from a normally opened position into a closed position about the belled ends of the tubes to restrain the bells of the tubes against axial movement, and expanding means for passing an expanding tool into each tube through the belled end thereof to expand the tube walls into contact against the fin plates and tube sheets of the unit while the bells are restrained in said clamping fixture.

2. The apparatus of claim 1 that further includes a movable table means for transporting the clamping fixture between a standby position wherein the jaw members are located adjacent to the belled ends of the tubes and a clamping position wherein the bells are situated between the open jaw members and means to move the table between positions.

3. The apparatus of claim 2 wherein each of said jaw pairs has a plurality of contoured split cavities passing through the jaw members in each of said jaw pairs, the cavities complementing the tube bells and being arranged to open and close about the bells when the table is moved into a clamping position.

4. The apparatus of claim 3 wherein the expanding means further includes rods for supporting an expanding tool in each of said cavities, said rods being slidably supported within said table beneath the clamping fixture, and reciprocating means for moving the rods axially into and out of said tubes.

5. The apparatus of claim 1 that further includes a series of push rods for operatively connecting corresponding jaw members in adjacent jaw pairs, said push rods being spaced apart along the length of the members to apply equal closing force between the members as the jaws are brought to a closed position.

6. The apparatus of claim 5 wherein each of the push rods is slidably contained within an intermediate jaw member.

7. The apparatus of claim 1 that further includes a stop means associated with each of the jaw pairs for arresting the movement of the jaw members when the jaws are placed in a fully closed position.

8. Apparatus for expanding tubes into a plate-fin heat exchanger unit having parallelly aligned hairpin tubes passing in rows through the fin plates and tube sheets of the unit to position the open ends of the tubes a predetermined distance beyond one of the tube sheets that includes
   a forming means for deforming the open end of each tube outwardly in a radial direction between the end of the tube and the tube sheet to form a bell therein,
   a clamping means having a series of normally opened coacting jaw pairs, each jaw pair being arranged to close over the bells in a row of tubes,
   expanding means having a series of expanding rods movably mounted beneath the clamping means that are arranged to pass through the jaws into the belled end of tubes, and drive means for inserting the rods into the tubes to expand the tubes radially into the fin plates and tubes sheets of the unit.

9. The apparatus of claim 8 wherein the bell forming means is located within a first processing station and the clamping and expanding means is located within a second processing station and which further includes transport means for sequentially indexing a plate fin unit into said first and second processing stations.

10. The apparatus of claim 9 wherein said clamping means includes a clamping fixture having a pair of opposed stationary walls, coacting jaw pairs equal in number to the number of tube rows in said unit a movable support for suspending the jaw pairs between said walls, each jaw pair having a first jaw member and a second jaw member arranged to open and close about the belled ends of the tubes in one of the rows, said movable support including a first slide secured to the first jaw members, and a second slide secured to the second jaw members whereby the jaws move in unison as they open and close about the bells, biasing means to urge the jaws into an open position and closure means acting on at least one first jaw member and one second jaw member to move the members into a closed position.

11. The apparatus of claim 10 that further includes a movable platform for moving the clamping fixture between a ready position beneath the belled ends of the tube to a clamping position wherein the bells are situated between the open jaw members, and means to move the platform between positions.

12. The apparatus of claim 11 wherein each jaw pair contains a plurality of contoured split cavities passing therethrough that complements the tube bells and which are arranged to close over the bells when the jaws are moved to a closed position.

13. The apparatus of claim 9 that further includes a movable collet plate positioned in the first processing station adjacent to the open ends of the tubes contained in a unit indexed into said first station, a plurality of internal collets mounted on the plate in axial alignment with the tubes, means to move the plate towards said tubes to position the collets within the open ends of the tubes, and means to expand the collets radially to deform the ends of the tubes.

14. The apparatus of claim 8 that further includes a series of push rods cooperatively connected to corresponding jaw members in adjacent jaw pairs, said push rods being spaced apart along the length of the jaw members to apply an equal closing force between the members as the jaws are brought to a closed position.

15. The apparatus of claim 14 wherein each of the push rods is slidably contained with an intermediate jaw member.

16. The apparatus of claim 8 that further includes a stop means associated with each of the jaw pairs for arresting the movement of the jaw members when the jaws are placed in a fully closed position.

* * * * *